Nov. 12, 1940.     B. R. NYHAGEN     2,221,314
HAIR CUTTING IMPLEMENT
Filed July 23, 1937     2 Sheets-Sheet 1
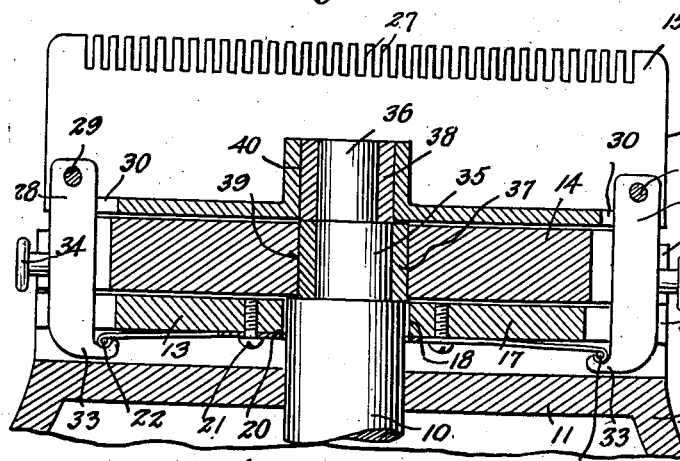
Fig. 1.
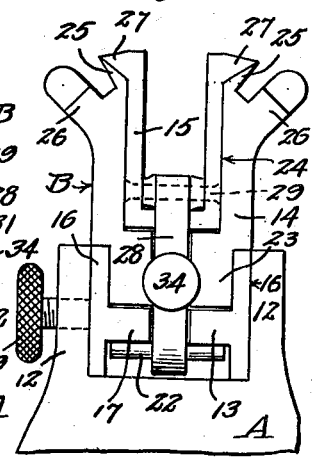
Fig. 2.
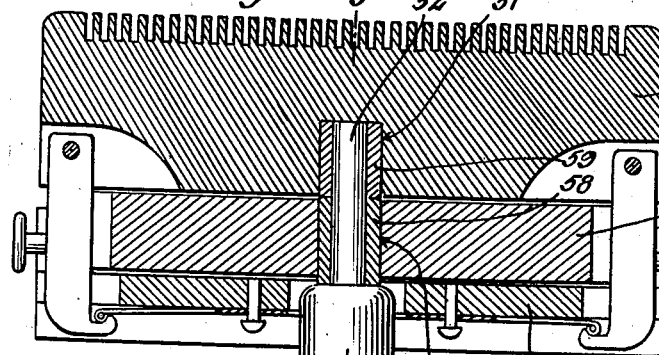
Fig. 3.
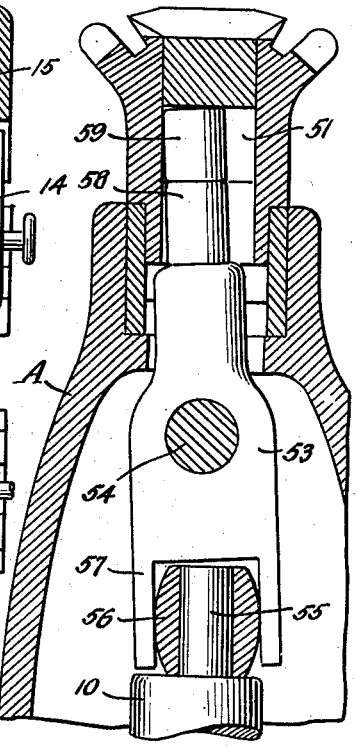
Fig. 5.
Fig. 4.
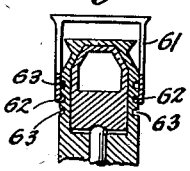
Fig. 6.
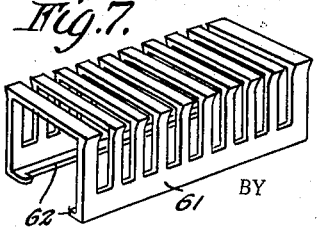
Fig. 7.
INVENTOR.
BARNEY R. NYHAGEN
BY Clarker Ott
ATTORNEYS

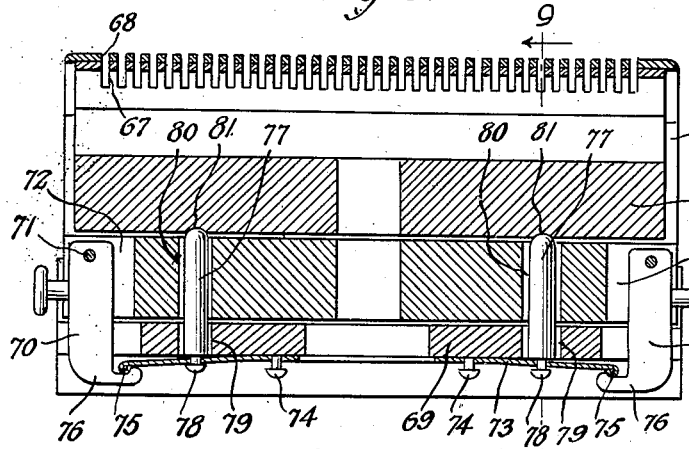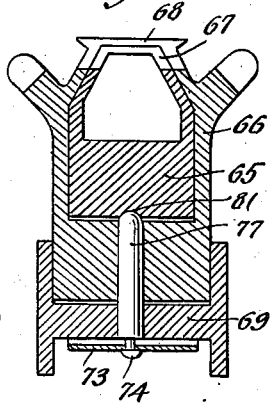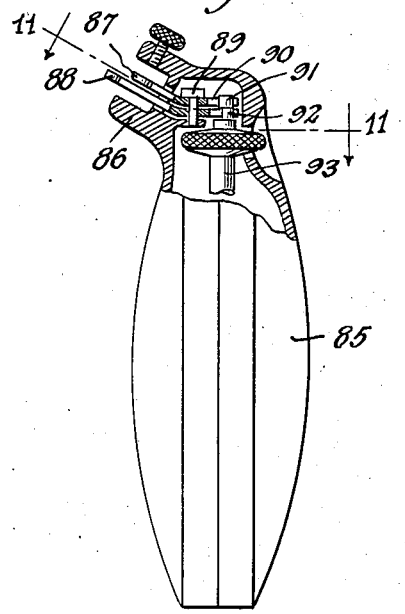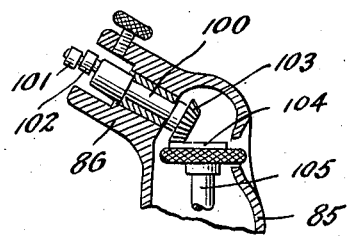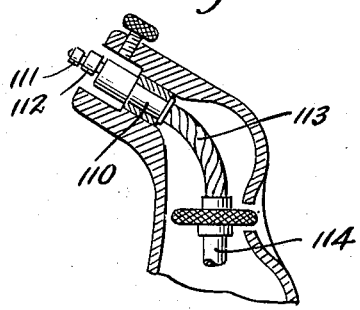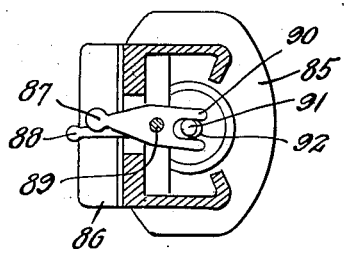

Patented Nov. 12, 1940

2,221,314

UNITED STATES PATENT OFFICE 2,221,314

HAIR CUTTING IMPLEMENT

Barney R. Nyhagen, Bronx, N. Y.

Application July 23, 1937, Serial No. 155,197

5 Claims. (Cl. 30—43)

This invention has relation to motor driven hair cutting implements or dry shavers and embodies a number of improvements upon those previously devised and now in use.

Broadly, the invention comprehends an implement of the indicated character in which the complementary shearing blades are mounted and driven so as to both move with reference to the supporting means therefor and to move in opposite directions with reference to each other in contra-distinction to those previously devised wherein one of the shearing blades is fixed with reference to the supporting means.

The invention further provides in an implement of this character means for effecting the greater movement of one of the cutter elements with reference to the other and preferably a lesser movement of the cutter element which engages with the skin.

The invention is also directed to a hair cutting implement or dry shaver in which the tension means for drawing and maintaining the teeth of the shearing blades in contact with each other is so constructed as to compensate for the relative movement of the blades, while serving as a means for releasably retaining the blade units in assembled relation.

The invention aims as a further object to provide guard teeth so arranged with reference to the shearing teeth of the cutter elements as to stretch the skin and thereby raise up and present the hairs to the shearing teeth for obtaining a closer shave.

As a further feature the invention embodies an adjustable gage detachably associated with the implement to permit of its use for trimming hair to desired lengths within certain limits.

The invention furthermore resides in the various structural combinations and arrangement of elements to carry out the invention and while several preferred embodiments have been shown and described, by way of example, they are not intended to act as a limitation upon the scope of the invention defined by the appended claims.

In the drawings:

Fig. 1 is an enlarged fragmentary vertical longitudinal sectional view of a hair cutting implement or dry shaver constructed in accordance with one form of the invention.

Fig. 2 is an end view thereof.

Fig. 3 is a view similar to Fig. 1 illustrating an alternate form of blade actuating means.

Fig. 4 is a bottom plan view of the cutter element with parts broken away to show the underlying structure.

Fig. 5 is a transverse sectional view taken approximately on the line 5—5 of Fig. 3.

Fig. 6 is an end view showing the detachable and adjustable hair trimming gage in applied position.

Fig. 7 is a perspective view of the gage removed from the cutting implement.

Fig. 8 is a vertical longitudinal sectional view of another form of cutter unit.

Fig. 9 is a transverse sectional view therethrough taken on the line 9—9 of Fig. 8.

Fig. 10 is a side view with parts in section illustrating a further modification of the invention.

Fig. 11 is a sectional view therethrough taken on the line 11—11 of Fig. 10.

Figs. 12 and 13 are fragmentary vertical sectional views showing still further modifications of the blade reciprocatory means.

Referring to the form of the invention illustrated in Figs. 1 and 2, A designates generally the handle or holder of the hair cutting implement or dry shaver which houses the usual electric motor, not shown, the rotary driven shaft 10 of which motor extends through the end wall 11 of the handle and protrudes therefrom. The end wall 11 is provided with outwardly projecting spaced parallel flanges 12 defining a groove in which is adapted to be removably positioned a cutter unit designated generally by the reference character B.

The cutter unit B is composed of a fixed section 13 and movable sections or cutter elements 14 and 15 which are designed to be actuated by the motor shaft 10 and which elements are mounted and driven so as to both move with reference to the handle member A and the fixed section 13.

As shown, the fixed section 13 is of substantially H-shape in cross section and includes vertical side walls 16 spaced apart and joined by a horizontal web 17 which is centrally apertured at 18 to freely receive therethrough the protruding portion of the motor shaft 10, the outer surfaces of the side wall 16 of the fixed section being adapted to fit within the inner surfaces of the flanges 12 and a set screw 19 being threaded through one of the flanges 12 of the handle A to releasably retain the fixed section in place.

A longitudinally bowed leaf spring 20 is secured to the underside of the horizontal web 17 by means of screws or other equivalent fastening devices 21 and the free rolled terminals 22 of said spring are normally flexed downwardly under the inherent resiliency of the spring and are tensioned against upward movement.

The movable section 14 which constitutes one of the cutter elements is of generally U-shaped cross sectional configuration and has rabbeted lower corners providing a reduced lower end 23 for guided sliding movement within the recessed upper portion of the fixed section 13. The section 14 is centrally grooved longitudinally as at 24 and is formed at its upper end with laterally outwardly inclined tapered fins 25 which are notched to provide cutting teeth. The section 14 is also provided with laterally outwardly inclined ledges 26 spaced outwardly from the fins 25 and provided with aligned notches to provide aligned guard teeth to serve as a means to stretch the skin in the space between the ledges and fins when pressed against the skin and thereby raise up and present the hairs to the shearing teeth for obtaining a closer cut or shave without any possibility of cutting or scratching the skin with the edges of the shearing teeth.

The cutter element 15 which is also of U-shaped cross sectional configuration, has a sliding guided fit within the groove 24 of the element 14 and is formed at its upper end with laterally protruding tapered ridges 27 which are notched to provide shearing teeth complementary to the shearing teeth of the fins 25, the confronting faces of the fins 25 and ridges 27 being disposed in flat contact with each other.

In order to removably retain the elements 14 and 15 in assembled relation with each other and with the fixed section 13, a pair of latch arms 28 are provided, one being arranged and pivotally connected as at 29 within a recess 30 at each end of the element 15. The latch arms depend from the element 15 and extend through notches 31 and 32 provided at the opposite ends of the element 14 and fixed section 13. The lower ends of the latch arms 28 are provided with hooked terminals 33 which are engaged under the rolled terminals 22 of the leaf spring 20 to detachably hold the sections 13, 14 and 15 in assembled relation. The terminals of the spring 20 function to draw and maintain the confronting faces of the fins 25 and ridges 27 into contact with each other to insure a proper shearing action when the elements 14 and 15 are reciprocated and to compensate for wear on said faces. The latch arms are provided with manipulating buttons 34 for the purpose of manually engaging and disengaging the same with the spring terminals 22.

In order to effect reciprocatory movement of the elements 14 and 15 in opposite directions with reference to each other and movement of both of the elements with reference to the fixed section 13 and the holder A, the motor shaft 10 is provided at its upper end with a pair of crank or eccentric pins 35 and 36, which cam pins have their axial centers eccentric to each other and eccentric to the motor shaft 10 and which cam pins are preferably surrounded by anti-friction rollers 37 and 38 respectively operating in transverse grooves 39 and 40 in the elements 14 and 15 respectively.

Obviously, under this construction and arrangement rotation of the motor shaft 10 will, through the eccentric or crank pins 35 and 36, cause the elements 14 and 15 to be reciprocated with reference to each other in opposite directions, while both elements move with reference to the fixed section 13 and handle A. The slight relative movement is compensated for by the pivotal connection of the latch arms 28 and the resiliency of the leaf spring 20. Due to the fact that the ledges defining the guard teeth, the fins providing one set of shearing teeth, and the ridges 27 providing the complementary shearing teeth, are all in contact with the skin and are relatively moving while in said contact, the skin will be agitated, massaged and manipulated during the cutting or shaving operation so as to insure a close and even cutting or shaving.

In the form of the invention illustrated in Figs. 3, 4 and 5, the general construction is substantially the same as that disclosed in Figs. 1 and 2, the only difference residing in the means for imparting the reciprocatory movement of the cutter elements 14 and 15. In this form, the cutter elements 14 and 15 are provided respectively with transverse angularly disposed grooves 50 and 51 which are actuated by the terminal 52 of a lever 53 pivoted as at 54 in the handle or holder member A for transverse rocking movement. The transverse rocking movement is imparted to the lever 53 by a crank or eccentric pin 55 on the upper end of the motor shaft 10. The crank or eccentric pin is surrounded by an anti-friction roller 56 which operates in the bifurcated lower end 57 of the lever while the terminal 52 of the lever is surrounded by a pair of anti-friction rollers 58 and 59.

Preferably, in order to impart a shorter reciprocatory stroke to the cutter element 15 than to the cutter element 14, the groove 50 has a greater pitch or angularity than the groove 51. In other respects, this form of the invention both as to the general construction, method of assembly and mode of operation is identical with the previously described form of the invention.

In order to utilize the cutting implement or dry shaver for trimming the hair to desired lengths within certain limits, a slotted gage 61 is illustrated in Figs. 6 and 7 for detachable association with the cutter unit, the same being of channel shape in cross section and formed at its open lower end with inwardly projecting beads 62 engageable selectively in grooves 63 formed on the opposite sides of the cutter unit.

The invention is also applicable to other types of cutters exemplified in Figs. 8 and 9 wherein one cutter element 65 is located wholly within the confines of the other cutter element 66 and both of the cutter elements are of a tubular formation and transversely slotted as at 67 and 68 to provide complementary shearing teeth. The outer cutter element 66, in this type of the device, also includes the fixed unit or section 69, similar to and the equivalent of the fixed section 13 and the same is of the H-shape cross sectional construction with the outer unit 65 slidably guided therein. In this type of razor, however, the mode of connection and assembly is slightly different as the latch arms 70 are pivoted at 71 in the recesses 72 formed at the opposite ends of the outer cutter element 66, while a leaf spring 73 anchored by screws or fastening elements 74 to the underside of the web of the fixed section 69 has its opposite rolled terminals 75 engaging with the hooked lower ends 76 of the latch arms 70. In this instance, a pair of pins 77 are loosely attached by headed studs 78 to the leaf spring 73 adjacent the rolled terminals 75 and project upwardly through openings 79 in the web of the fixed section and thence through openings 80 in the base portion of the outer cutter element 66, the openings 79 and 80 being slightly larger than the pins to permit of the reciprocatory movement of the cutter element and a slight rocking action of the pins when the cutter unit is functioning. The upper ends of the pins 77 are rounded and fit into concave recesses 81 in the undersurface of the base portion of the inner cutter element 65. In other respects, the cutter unit is similar to and functions in the same manner as the previous forms of the invention.

In order to illustrate variations in construction of the hair cutting implement or dry shaver, there is disclosed in Figs. 10 and 11, a handle or holder member 85 having a recessed upper end portion 86 for the reception of a cutter unit which recess portion is disposed at an angle to the plane or axis of the handle or holder element 85. In this instance, motion is imparted to the shearing elements of the cutter unit by a pair of rock levers 87 and 88 which are pivoted as at 89 within the upper end portion of the handle or holder member and which rock levers are provided with bifurcated terminals 90 which actuate respectively by crank pins 91 and 92 on the upper end of the motor shaft 93.

Alternate forms of drive means are disclosed in Figs. 12 and 13 of the drawings and in Fig. 12 the angulated recessed upper end portion 86 has extending therethrough a stub shaft 100 which is formed at its outer end with the eccentric pins 101 and 102 for actuating the cutter elements of the cutter unit. The inner end of the stub shaft 100 is formed with a beveled pinion 103 which meshes with a bevel gear 104 on the motor shaft 105.

In Fig. 13, the stub shaft 110 provided at its outer end with the eccentric pins 111 and 112, is connected with a flexible shaft 113 connected with the motor shaft 114.

By imparting a shorter stroke to the shearing element which contacts with the skin, the same sinks into the skin and gives the hair a better chance to enter between the shearing teeth so as to make for a closer and smoother shave.

What is claimed is:

1. In an electric dry shaver, a holder having a recessed end and a motor driven actuating element protruding from said recessed end, a cutter unit carried by said holder including a fixed H-shaped section detachably secured within the recessed end of the holder, a pair of cutter elements having complementary shearing teeth mounted within the fixed section and driven by said protruding actuating element so as to both reciprocate longitudinally with reference to the holder member and fixed section, interengaging spring latch means provided on one of said cutter elements and said fixed section for detachably assemblying said cutter elements and fixed section and for drawing the confronting faces of the complementary teeth of said cutter elements into engagement with each other.

2. In a hair cutting implement, a holder having a recess extending longitudinally of one end thereof, a lever fulcrumed within the holder for lateral swinging movement having an actuating terminal protruding from the recessed end, a cutter unit carried by said holder including a fixed section removably secured within the recessed end and a pair of complementary cutter elements having laterally disposed oblique slots arranged at opposite angles and engaged by said actuating terminal to effect reciprocations of said cutter elements with reference to the holder and fixed section in opposite directions with reference to each other.

3. In an electric dry shaver, a holder and actuating member, a cutter unit carried by said member including a fixed section detachably secured thereto and a pair of complementary cutter elements mounted within the fixed section, and driven by said actuating member, said cutter elements having complementary teeth projecting laterally outward at an angle and along opposite sides of said cutter elements, and a pair of guard ledges on one of said cutter elements spaced outwardly from the teeth and laterally inclined with reference to the cutter teeth for stretching the skin to present the hair to the teeth in an erect position.

4. In a motor driven hair cutting implement, a holder and actuating member, a cutter unit carried by said member including a pair of complementary cutter elements mounted and driven to reciprocate in opposite directions, and a transversely slotted gage element detachably and adjustably associated with said cutter unit to space the cutter elements from the skin so as to gage the length to which the hair is to be cut, said gage element being of substantially channel-shaped cross section having inwardly directed beads and said cutter unit having a series of grooves on the opposite sides thereof for selectively receiving said beads.

5. In a dry shaver, a cutter unit including a stationary section and a pair of cutter elements having complementary shearing teeth mounted upon the fixed section and adapted to be reciprocated in opposite directions with reference to each other and the fixed section, and means for detachably assemblying said cutter elements and the fixed section and for maintaining the confronting faces of the shearing teeth in engagement with each other, comprising a leaf spring attached to the underside of the fixed section, pivoted latches carried by one of the cutter elements and detachably engaging opposite ends of the leaf spring, upstanding pins fulcrumed at their lower ends to the leaf spring and seated at their upper ends in socketed portions of the other cutter element and extending through slotted portions of the fixed section and first mentioned cutter element.

BARNEY R. NYHAGEN.